No. 852,569. PATENTED MAY 7, 1907.
L. LYNDON.
SECONDARY BATTERY.
APPLICATION FILED JUNE 3, 1905.
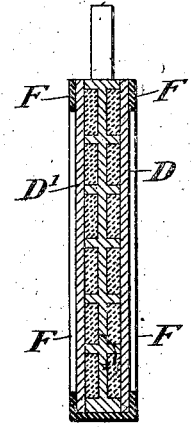
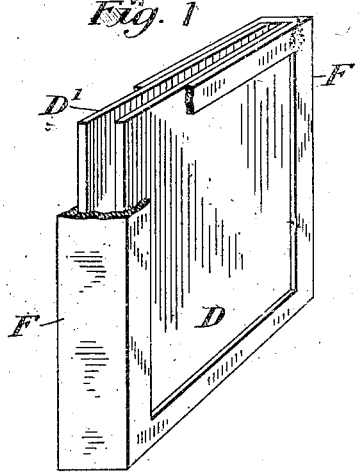
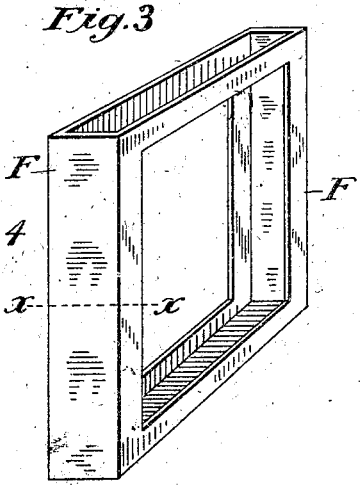
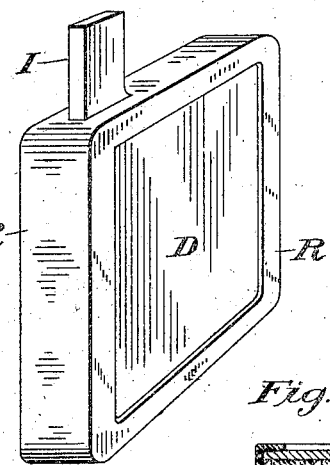
Witnesses:
Chas. R. D. King.
Benj. Boman.
Inventor:
Lamar Lyndon

UNITED STATES PATENT OFFICE.

LAMAR LYNDON, OF NEW YORK, N. Y.

SECONDARY BATTERY.

No. 852,569.

Specification of Letters Patent.

Patented May 7, 1907.

Application filed June 3, 1905. Serial No. 263,551.

*To all whom it may concern:*

Be it known that I, LAMAR LYNDON, a citizen of the United States, a resident of the borough of Manhattan, city, county, and State of New York, have invented certain new and useful Improvements in Envelops for Electrodes, of which the following is a specification accompanied by drawings.

The object of this invention is to provide an envelop through which electrolyte may freely pass and electrolytic action take place, but which is substantially impervious to solid material, even if in a very finely divided state and held in suspension in the electrolyte.

Another object is to cause a more uniform distribution of electrolytic or electro-chemical action over the surface of the electrode.

Another object is to reduce the height of the containing cell or jar in which the electrodes and electrolyte are placed.

Electrodes in storage batteries consist, usually, of a supporting and conducting structure to which the active material is attached. The continued use of the electrodes results in a loss of part of this material. Some of it flakes off in particles of appreciable size, but most of the loss comes from the carrying away of the material in extremely fine particles held in suspension by the electrolyte: This suspended material gradually settles down at the bottom of the cell or jar in which the electrodes and electrolyte are contained, and form the well-known "mud" or sediment which is observable in storage batteries after protracted use. This sediment is a conductor and therefore will short circuit the electrodes of opposite polarity if a sufficient amount of it accumulates to bring its level up high enough to touch the lower edges of the electrodes. It has therefore been necessary to frequently remove the electrodes from the containing vessel and wash out the accumulated sediment to prevent the possibility of this short circuiting. It has also been necessary to make high supporting ribs in the bottom of the cell for the plates to rest on or to suspend the plates from the top of the cell, leaving in either case a considerable space between the bottom of the cell and the lower edge of the plates, giving room for the sediment to accumulate without touching the plates. Also the active material which is carried off from the electrodes represents a corresponding loss in battery capacity. If the material should be retained in position the life of the battery would be greatly increased and the capacity better maintained.

I am aware that numerous forms of envelop have been tried, comprising perforated rubber and celluloid, cloths specially treated to resist the destructive action of the electrolyte (pyroxylin) and the like, which have somewhat improved the life of battery electrodes, but none has yet been produced which allows free passage of the electrolyte but restrains the passage of particles held in suspension.

Certain types of battery plates have been made up with porous diaphragms as an integral part of the electrode but the edges of the diaphragms on opposite faces of the electrode were not sealed together and loosened particles of the material could pass out at the narrow openings at the edges.

Primarily; my invention consists of two thin diaphragms of porous material—preferable coarse-grained wood—united at the sides and lower edge by a hard rubber or celluloid framework the whole forming a thin box which may be slipped over the plate. If the upper edges of the box be above the surface of the electrolyte, it is unnecessary to seal the top, as in this case the electrolyte can only pass to or from the electrode, through the pores of the diaphragm. Unless the wood, or other material used for making the diaphragm, has very large pores, no particles of the active material can find their way through the diaphragms and therefore no loss of active material can take place and the accumulation of sediment in the cell is prevented.

Figures 1, 2 and 3 show a preferred form. D and D' Fig. 1 are sheets of porous wood. F. F. is a frame of hard rubber, celluloid or similar material, being in effect a box having its faces cut away to leave openings extending almost across from edge to edge, sufficient stock being left to overlap the wooden sheets. Fig. 3 shows this frame in perspective. In assembling, one diaphragm D' is slipped into the frame then the plate and lastly the diaphragm, D. Fig. 1 indicates the arrangement of the envelop made in this manner, and Fig. 2 is a section through a plate covered by this form of envelop.

Another method of making up this envelop is shown in Fig. 5. R. R. is an endless piece of elastic material—*e. g.* rubber,—having a slit cut in the proper place for the terminal T of the plate to pass through. The diaphragms D and D'—D only being visible in the figure—are laid against opposite faces of the plate and the elastic band or channel R. R.—of which Fig. 6 is a cross sectional view—is stretched around the edges of the plate and diaphragms, holding the latter well against the plate and effectually sealing the envelop at its edges.

Obviously an envelop; such as is herein shown and described, by preventing the disintegration and separation of the active material, prevents the accumulation of sediment in the bottom of the containing cell and therefore admits of the use of a shorter jar or containing vessel.

Wood has been specified as the preferable material for the porous diaphragm. The most conspicuous reasons for its superiority are (1) cheapness (2) ease of renewal (3) lightness (4) it is thinner for required strength and toughness than any other material (5) it is elastic to a certain extent and is not fragile (6) it does not contain metallic impurities (7) the sheets may be manufactured with comparatively little preparation. The wood may be treated to better resist the action of the electrolyte and an additional protecting covering of perforated rubber, celluloid or the like may be used in conjunction with this envelop if desirable. Obviously no additional separators are required when battery plates are incased in these envelops.

While this form of envelop is particularly adapted for storage battery electrodes it may be used for a variety of other purposes.

Obviously this invention may be embodied in widely varying forms therefore without limiting the invention to the constructions shown and described nor enumerating variations and equivalents I claim as my invention:—

1. An envelop for storage battery electrodes comprising two porous diaphragms of vegetable matter, one being laid against either face of the electrode, in contact with the active material thereof, the edges of the diaphragms being so closed up as to exclude the passage of electrolyte to the electrode, except through the pores of the said diaphragm, and an unbroken and impervious flexible elastic acid resisting framework surrounding at least three edges of the said electrode, whereby the diaphragms are held in position and sealed at the surrounded edges.

2. An envelop for storage battery electrodes, comprising two porous diaphragms of vegetable matter, one being laid against each face of the electrode in contact with the active material thereof, the edges of the diaphragms being inclosed in a flexible elastic frame to exclude the passage of electrolyte to the electrode, except through the pores of the said diaphragm.

3. An envelop for storage battery electrodes, comprising two porous diaphragms of vegetable matter, one being laid against each face of the electrode in contact with the active material thereof, the four edges of the diaphragms being inclosed in a continuous flexible rubber frame stretched over the diaphragm to exclude the passage of electrolyte to the electrode except through the pores of the said draphragm.

LAMAR LYNDON.

Witnesses:
H. CHITTEMORE,
R. B. MARTEN.